(12) United States Patent
Calmon et al.

(10) Patent No.: US 11,436,094 B2
(45) Date of Patent: Sep. 6, 2022

(54) EFFICIENT METHOD TO BUILD A BACKUP SCHEDULING PLAN FOR A SERVER

(71) Applicant: EMC IP Holding Company LLC, Hopkinton, MA (US)

(72) Inventors: Tiago Salviano Calmon, Rio de Janeiro (BR); Hugo de Oliveira Barbalho, Rio de Janeiro (BR); Eduardo Vera Sousa, Niteroi (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 129 days.

(21) Appl. No.: 16/886,178

(22) Filed: May 28, 2020

(65) Prior Publication Data
US 2021/0374012 A1 Dec. 2, 2021

(51) Int. Cl.
*G06F 12/00* (2006.01)
*G06F 11/14* (2006.01)
*G06N 20/00* (2019.01)

(52) U.S. Cl.
CPC ...... *G06F 11/1461* (2013.01); *G06F 11/1451* (2013.01); *G06F 11/1464* (2013.01); *G06N 20/00* (2019.01)

(58) Field of Classification Search
CPC ............. G06F 11/1461; G06F 11/1451; G06F 11/1464; G06N 20/00
See application file for complete search history.

(56) References Cited

U.S. PATENT DOCUMENTS

2017/0132089 A1* 5/2017 Roehrsheim .......... G06F 16/113
2021/0232461 A1 7/2021 Calmon et al.

OTHER PUBLICATIONS

D. Reinsel et al., "IDC Data Age 2025: The Evolution of Data to Life-Critical Don't Focus on Big Data; Focus on the Data That's Big", IDC White Paper, Apr. 2017.
C. Liu et al., "Scheduling Algorithms for Multiprogramming in a Hard-Real-Time Environment", Journal of the Association of Computing Machinery, vol. 20, No. 1, Jan. 1973, pp. 46-61.
L. Cherkasova et al., "DP+IP = design of efficient backup scheduling", 2010 International Conference on Network and Service Managment, Oct. 2010, pp. 118-125.
L. Cherkasova et al., "Enhancing and optimizing a data protection solution.," 2009 IEEE International Symposium on Modeling, Analysis & Simulation of Computer and Telecommunication Systems, Aug. 6, 2009, pp. 1-10.

(Continued)

*Primary Examiner* — Gurtej Bansal
(74) *Attorney, Agent, or Firm* — Workman Nydegger

(57) ABSTRACT

One example method includes identifying a group of asset backups to be performed, and each asset backup is associated with a respective asset and has an associated backup time and RPO, selecting an asset backup to run first, and the asset backup that will run first is chosen based on a start deadline of that asset backup relative to respective start deadlines of one or more other asset backups, and the start deadline falls within a time slot, selecting a stream from a group of streams for the selected asset backup, and the selected stream is a stream with a lowest value of first available time slot, and backing up the asset at a backup server by running the selected asset backup, and backup begins at a start time that is a time when the selected stream becomes available, and the asset backup runs on the selected stream.

20 Claims, 11 Drawing Sheets

(56) References Cited

OTHER PUBLICATIONS

Y. Qin et al., "HyperProtect: Enhancing the Performance of a Dynamic Backup System Using Intelligent Scheduling," 2018 IEEE 37th International Performance Computing and Communications Conference (IPCCC), Nov. 2018, pp. 1-8.
S. Martello et al., "Linear Assignment Problems," Annals of Discrete Mathematics 31, 1987, pp. 259-282.
W. Xia et al., "A Comprehensive Study of the Past, Present, and Future of Data Deduplication", Proceedings of the IEEE, 2016.
Market Watch, Press Release, "Data Protection Market is Anticipated to Grow US$ 120 Billion By 2023", Jan. 16, 2019, https://www.marketwatch.com/press-release/data-protection-market-is-anticipated-to-grow-us-120-billion-by-2023-2019-01-16.

* cited by examiner

EFFICIENT METHOD TO BUILD A BACKUP SCHEDULING PLAN FOR A SERVER

FIELD OF THE INVENTION

Embodiments of the present invention generally relate to data protection. More particularly, at least some embodiments of the invention relate to systems, hardware, software, computer-readable media, and methods for automatic backup plan generation in environments where there is a need to backup multiple assets into a single server.

BACKGROUND

A challenging area in the field of data protection concerns backup environments that include multiple assets that need to be backed up, as well as multiple targets such as servers where the asset data is to be backed up. In environments with a relatively small number of assets and targets, it may be possible, though cumbersome, to implement human scheduling of backups. However, many backup environments may have hundreds, or even thousands, of assets, and hundreds or thousands of targets, and hundreds or thousands of backup streams. Moreover, the number of assets and targets in such complex environment may change over time as new assets and targets come online, and others go offline. Such environments may involve large amounts of data, and a large number of possible decisions to be made on an ongoing basis in response to changes in the environment.

Such complex and dynamic backup environments present significant challenges to the scheduling and execution of backups that are required to meet service level agreements (SLA) between the asset owner and backup service. For example, in such environments, it is not possible for a human to devise, or timely revise, a global plan for backup scheduling that indicates when to execute the backup, while also respecting hardware limitations and minimizing RPO violation. Instead, resort may be made to siloed information in an attempt to deal with the complexities and dynamic nature of such environments. However such an approach is undesirable at least insofar as it results in inefficiencies in terms of backup server utilization in the best case scenario, or failure to comply with the SLAs in the worst case scenario.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
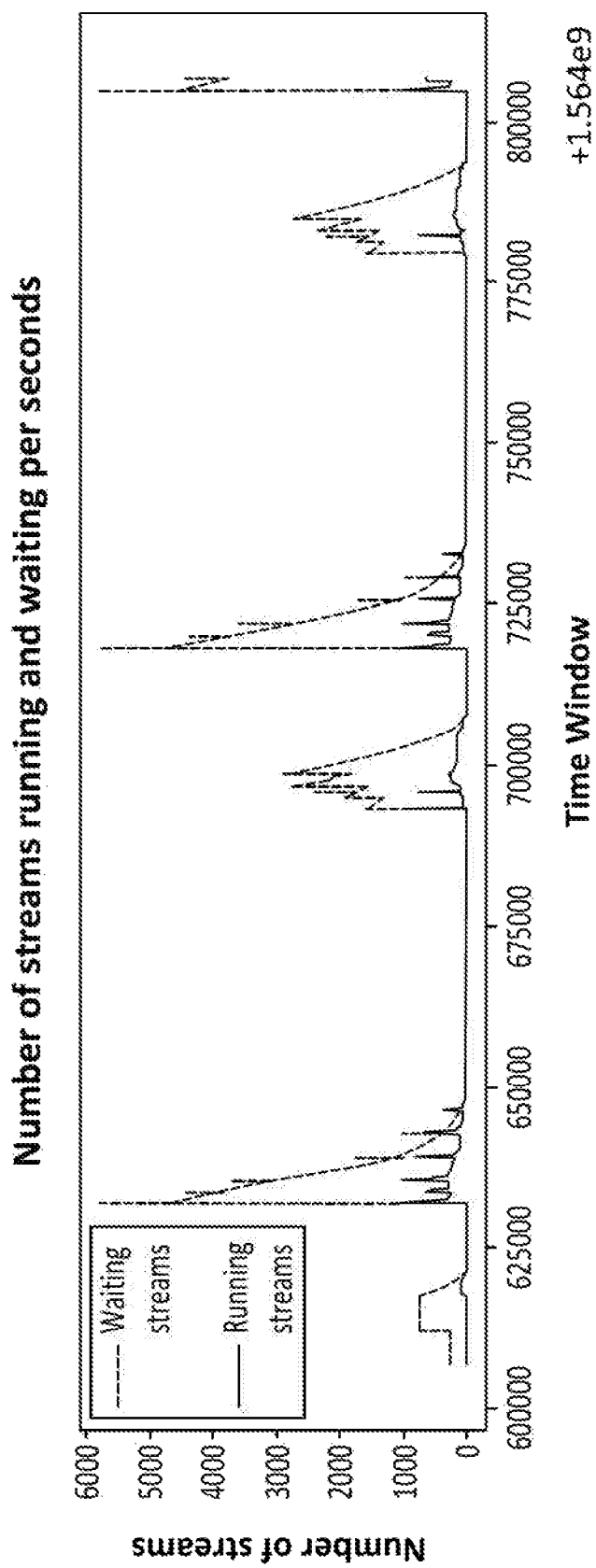
FIG. 1 illustrates the problem of running streams versus waiting streams in a backup environment.

Embodiments of the present invention generally relate to data protection processes. More particularly, at least some embodiments of the invention relate to systems, hardware, software, computer-readable media, and methods for automatic backup plan generation in environments where there is a need to backup multiple assets into a single server. The backup plan may take account of resource availability and limitations, while also respecting, to the extent possible, SLA parameters such as RPO.

In general, example embodiments of the invention include methods for automatically setting a backup schedule for multiple asset backup into a single server environment. Example approaches, which may employ smart data structures, may be scalable to a large number of assets, possibly thousands or more, while at the same time respecting the system limitations such as backup server availability, and minimizing any violations of Recover Point Objectives (RPO) such as may be specified in an SLA.

In at least some embodiments, a backup schedule may be generated by a backup server based on input received from one or more assets. In other embodiments, a backup schedule may be generated by a scheduling entity that communicates with one or more assets and one or more backup servers. More generally however, it is not required that a backup schedule by generated by any particular entity. In at least some embodiments, the scheduling entity may also receive input from a user, such as by way of a User Interface (UI) such as a GUI or CLI. Such inputs may include any of the inputs disclosed herein, one example of which is RPO, discussed in more detail below. However, receipt of user input is not required.

Example embodiments may involve various processes. In one example embodiment, the initial stage involves defining the inputs of the problem to be solved, then decomposing the problem into two simpler problems. The inputs may include, for example, SLA requirements such as RPO, the number of assets to be backed up, and the capabilities, such as a supportable stream count, of the server where the backup is to be performed. One of the problems with which the inputs are concerned may be determining where to backup each asset. This may be referred to as the assignment problem as it concerns assignment of the backup of an asset to a particular server. The other problem with which the inputs in this example are concerned may be determining, for a particular server, when to execute each of multiple different backups assigned to that server. This may be referred to as the single server backup scheduling problem. With the problems and inputs thus defined, a backup schedule solution may then be determined.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a global backup schedule may, based on various inputs, be automatically defined and implemented for backing up multiple asset streams into a single backup server. In an embodiment, a global backup schedule may embrace multiple geographically diverse sites, one or more of which may comprise multiple assets to be backed up and/or multiple backup servers. In an embodiment, a backup schedule takes into account SLA constraints, as well as hardware considerations such as the stream count capability, and availability, of a backup server to which multiple backup streams may be assigned. In an embodiment, a backup schedule may be automatically defined and implemented in an environment that includes a large number, such as hundreds or thousands, of assets and backup servers. In an embodiment, a backup schedule may be revised and implemented on-the-fly as changes in the backup environment, such as addition/removal of assets and/or backup servers, are detected. In an embodiment, optimal use may be made of available backup assets and associated stream counts, in view of SLA constraints and the assets to be backed up.

A. General Aspects of An Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such data protection operations may include, but are not limited to, data read/write/delete operations, data deduplication operations, data backup operations, data restore operations, data cloning operations, data archiving operations, disaster recovery operations, and scheduling operations for generating data protection schedules. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, DellEMC Cloud Storage, Microsoft Azure, Amazon AWS, and Google Cloud. More generally however, the scope of the invention is not limited to employment of any particular type or implementation of cloud storage, or distributed storage environment.

In addition to the storage environment, the operating environment may also include one or more clients that are capable of collecting, modifying, and creating, data. As such, a particular client may employ, or otherwise be associated with, one or more instances of each of one or more applications that perform such operations with respect Devices in the operating environment may take the form of software, physical machines, or virtual machines (VM), or any combination of these, though no Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

It is estimate that by 2025 about 20% of data worldwide will be critical to our daily lives and approximately 10% of that data will be hypercritical. Thus, having an infrastructure that guarantees the Service Level Agreements (SLAs) may be even more challenging. One of those challenges lies in the data protection environment, in which users must cope with the maximum amount of time that the user is willing to lose in terms of data. Thus, example embodiments of the invention include a method to schedule a backup plan that cope with SLA constraints and backup server hardware limitations. Such a method may heuristically build a backup plan with no, or very few, SLA violations.

In data protection schemas, backups play a central role in enabling high resilience and availability of data and, thus, protecting companies from various disruptions caused by data loss or data unavailability. On top of that, regulatory compliance made mandatory by governments demands that companies store some of their data for a long period of time. Because of that, it is common practice to rely on backup solutions to protect critical data from companies. In fact, companies in US are expected to spend more $120B dollars in data protection solutions by 2023, making this market a highly competitive marketplace for players with high growth potential.

The current era is one in which Artificial Intelligence (AI) is pervasive and may create competitive advantage for companies that have the most valuable data. It is not a surprise that companies do not want to lose their data, and also rely on data protection solutions to store massive amounts of data, which can be stored in different formats, examples of which are disclosed herein.

In a data protection environment, there may be two main service level metrics that rule the data protection pipeline, namely Recovery Point Objective (RPO) and Recovery Time Objective (RTO). RPO refers to the amount of time that the user or enterprise is willing to lose in terms of data. So, for example, if the RPO of a particular piece of data is 8 hours, the data protection solutions must ensure that copies of that piece of data are available in a period less than or equal 8 hours. Put another way, if the last good copy of the data is 8 hours old or less, the business can continue to operate in an acceptable manner. On the other hand, RTO refers to the amount of time that a user or entity is willing to wait until data is recovered from a disruption. So, if RTO for a given piece of data is 1 hour, this means that a recovery event for that data must take no more than one hour to meet the RTO requirement, and make the business run as usual again.

To cope with small RTOs, companies may rely on hardware and software innovations. As the number of low RTOs increases, building a backup plan may become increasingly difficult. To cope with RPOs, one approach is to schedule backups in a periodicity that respects the given service level agreements that specify the RPO, and RTO. One particular approach may be to schedule backups per asset and let the infrastructure handle the increasingly complex backup environment. The increasing complexity of a vital environment where there is an ongoing need to protect important data tends to be on the mind of only a few, or even just one, IT professional in the company.

Such concerns are a growing problem and may be even more apparent, and problematic, when environments grow. If each asset manager, or even a global backup manager, schedules backups per assets, a number of disruptions may occur. For instance, the maximum number of streams in a backup server might be small compared to the number of scheduled backups for the same time. In fact, FIG. 1 highlights this issue. Particularly, it can be seen in FIG. 1 that the number of waiting streams may be significantly greater than the number of running streams. Because, in this illustrative example, scheduling is done ad-hoc and on a per-asset basis, some backups might need to wait a long time from the scheduled time before the backups actually start. This makes RPO compliance ever more difficult and error-prone.

Example embodiments of the invention may serve to address, or prevent, such concerns by way of automatic processes which may determine a backup schedule based on, for example, Service Level Objectives (SLO) such as RPO, and system limitations. These process may ensure that backups occur within service levels, and, more specifically, the RPO for each asset. These processes may also be configured and implemented to perform as few operations as possible in order to still be able to handle new asset backups, if or when such new asset backups become necessary.

More particularly, embodiments of the invention may employ a heuristic approach to build a backup scheduling based, for example, on the Early Deadline First algorithm used to schedule jobs in online systems. This approach may be applied into systems with low RPO values, given that in those cases, a relatively low granularity time period backup schedule may be required. The inputs to the example backup schedule generation processes are assets and their RPOs, and the output of the backup schedule generation processes may be a schedule for the next period(s) of time.

Figure 2:
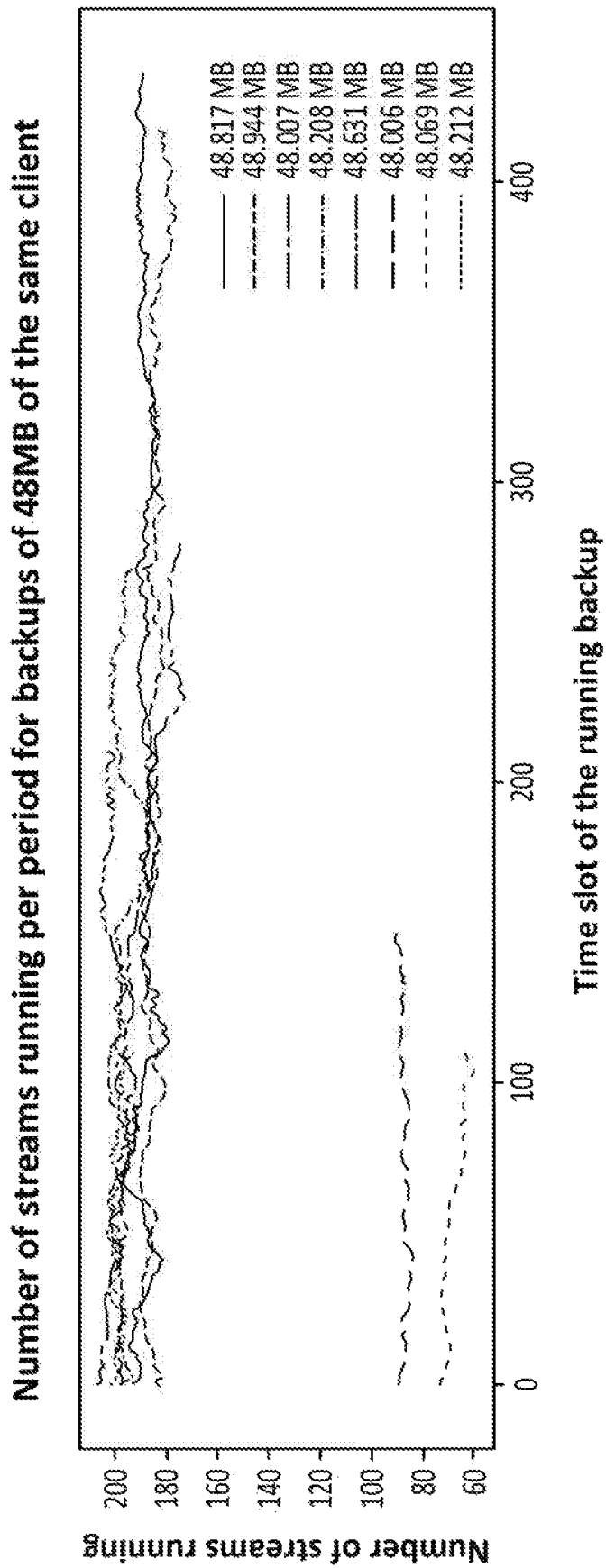
FIG. 2 illustrates the problems of extended backup times as a function of the number of backups performed simultaneously.

The disclosed backup schedule policies may minimize SLA violation, while also respecting the maximum number of streams a backup server can run at any one time. Respecting the maximum number of streams allows the backup server to execute a job faster, as indicated by FIG. 2, which illustrates a comparison between completion time for backup jobs of 48 MB in two different moments of the system. That is, it can be seen that when the number of backup streams is relatively large (Y-axis), near the top of the graph, the amount of time taken to run those backups may be relatively long (X-axis). On the other hand, when the number of backup streams is relatively small (Y-axis), near the top of the graph, the amount of time taken to run those backups may be relatively short (X-axis). In some embodiments, the disclosed heuristic may, for example, build a backup plan for a whole month considering a time granularity of 1 second. Some conventional approaches, on the other hand, may only be capable of building a backup plan of considerably higher granularity, such as about 5 minutes for example.

C. Aspects of Some Example Embodiments

Figure 3:
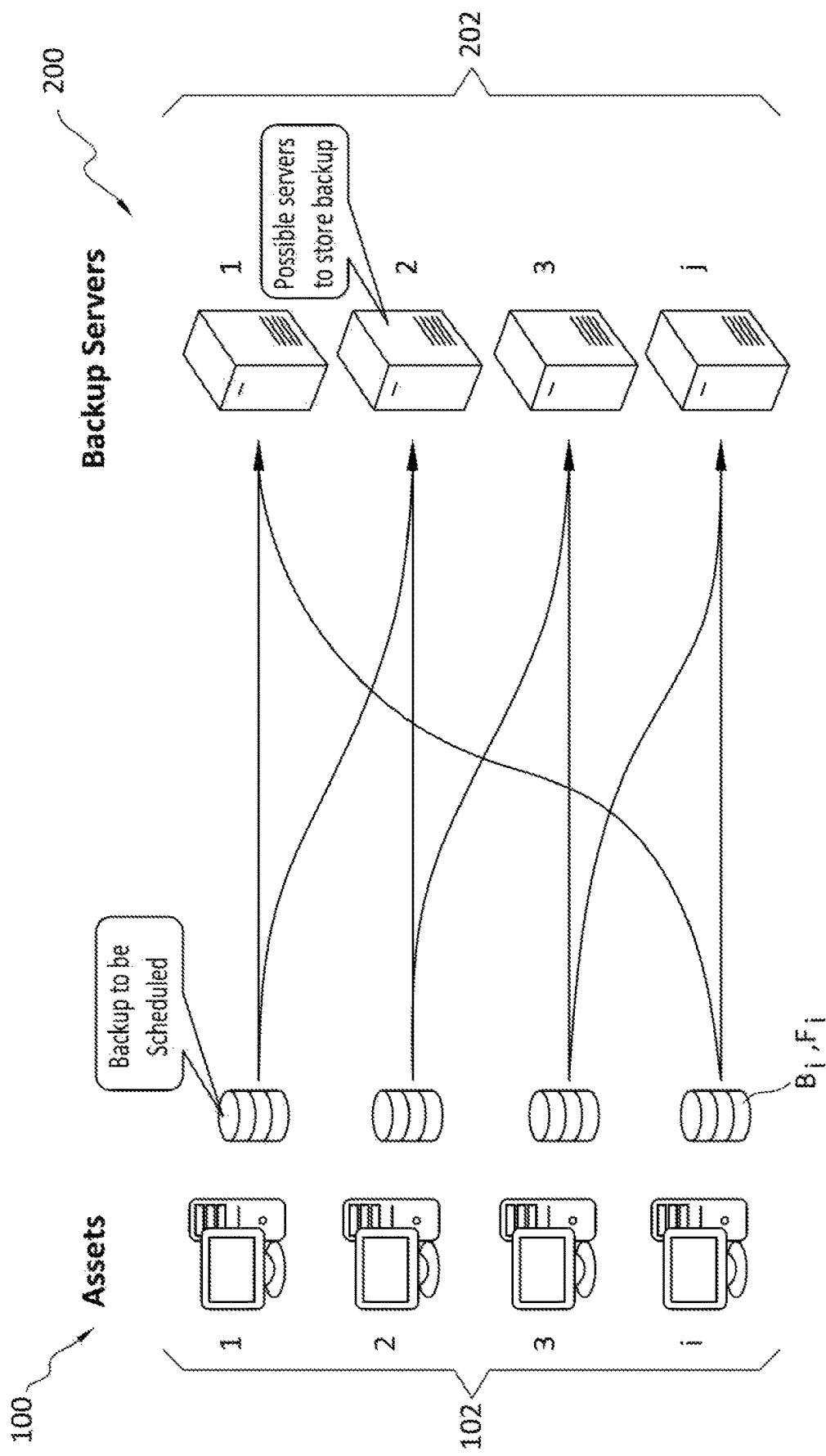
FIG. 3 discloses an example arrangement for which one or more backup schedules may be generated.

With reference next to FIG. 3, a pictorial representation is disclosed that represents an example of a problem that may be solved by embodiments of the invention, that is, a situation in which multiple assets are backed up to a single server. More particularly, FIG. 3 discloses an arrangement that includes a set A of assets 100 that includes assets 102, where i is 1. Each of the assets 102 may have an associated backup time, that is, the amount of time expected to be needed to backup the designated data of that asset. Thus, the backup time estimated for an asset i∈A is denoted by $B_i$ and may be directly derived with a machine learning process using an off-the-shelf regression technique such as Random Forest Regression for example. For each asset 102 i∈A, there may also be an associated frequency Fi representing the maximum amount of time the asset 102 can wait to start its next backup. Those frequencies F may be required to help ensure that the asset 102 meets its RPO. In some embodiments, the F for an asset 102 may be set as less than or equal to the maximum allowed RPO for that asset 102. It is noted that B and F may vary from one asset 102 to the next and may, for one or more particular assets 102, additionally or alternatively vary over time as well. As further indicated in FIG. 3, a set S of backup servers 200 includes 'j' backup servers 202. Each server 202 j E S may be capable of supporting a respective maximum number of backup streams, or simply 'streams,' during a particular timeframe Tj.

In general, the backup of the assets 102 may be planned to take place in a fixed window of time $W=\{1,2,\ldots,\tau\}$. Embodiments of the invention may also use a further piece of information, namely, the maximum time slot to start the first backup of the optimization window of time W, which is represented, for asset i, by $M_{istart}$. With these points in mind, the Multiple Servers Backup Plan problem (MSBPP) may be described as follows: for each asset 102 (A), MSBPP will assign and schedule its backup to a particular backup server 202 (S) to run in a specific set of continuous periods of time, that is, to determine in which time slots each asset 102 will back up to each server 202.

Figure 4:
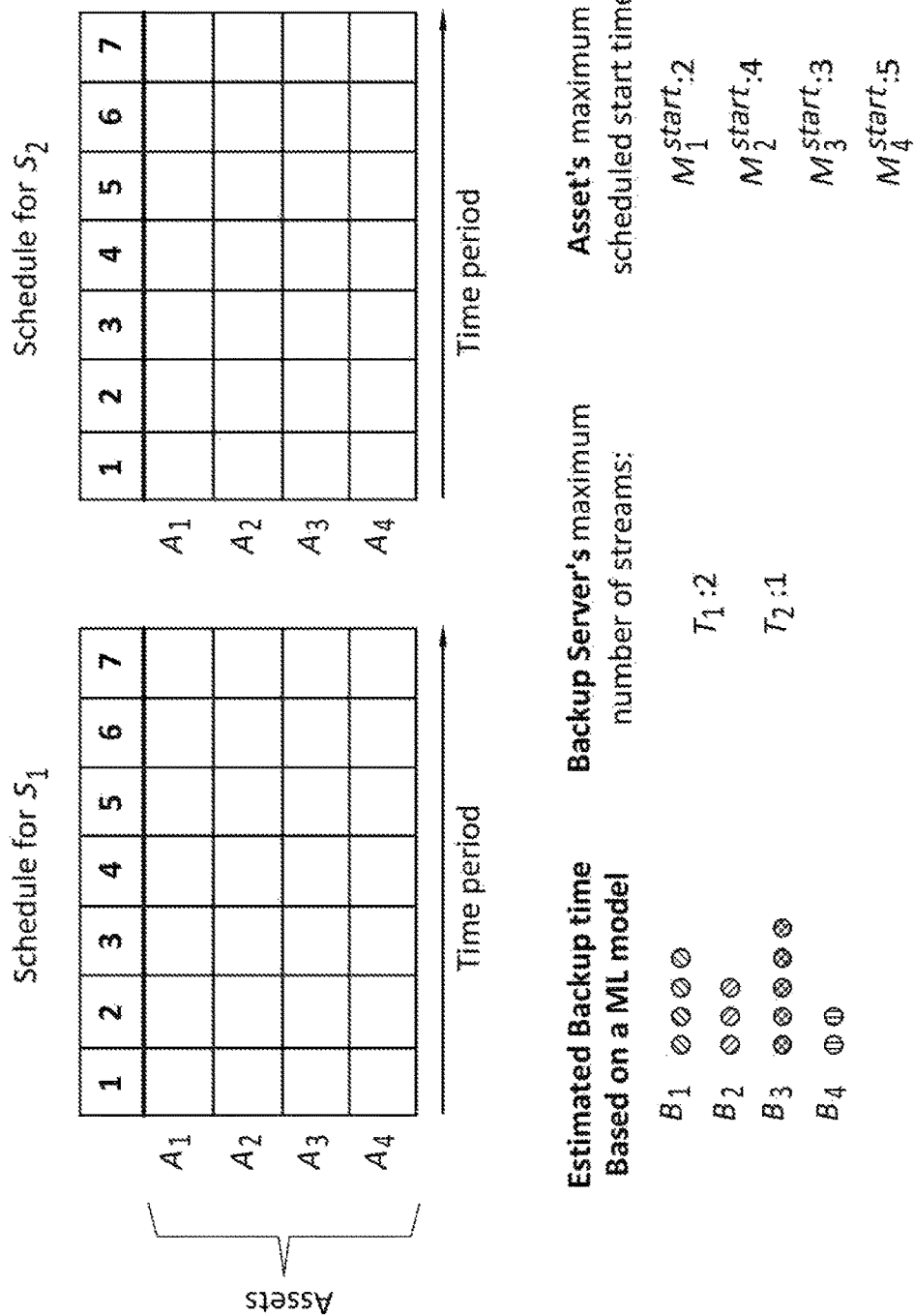
FIG. 4 discloses an example solution space for a backup schedule.

With reference now to FIG. 4, an example solution space is disclosed that may be generated based on a specified example time window frame (W) of 7 periods, that is, τ=7, and W={1, 2, 3, 4, 5, 6, 7}. In general, an embodiment of the invention may, for example, operate to determine at which times each asset 102 will be performing backups to which backup servers 202. In the particular example of FIG. 4, the assets $A_1$, $A_2$, $A_3$, and $A_4$ have the respective estimated backup times (or $B_{time}$): $B_1$=4, $B_2$=3, $B_3$=5 and $B_4$=2. The backup time refers to the amount of time needed to back up that particular asset.

It is noted that once a particular asset 102 is set to back up to a particular backup server 202, future backups of that asset 102 may not be sent to a different backup server 202. This constraint may be important to maximize the deduplication ratio. That is, if an asset 102 were backed up to more than one backup server 202, multiple copies of the same data segments may exist on those servers. On the other hand, if the asset 102 always backs up to the same backup server 202, any data segments already present on that backup server 202, as a result of a prior backup process, will not be duplicated in subsequent backup processes that include the same data segments.

Figure 5:
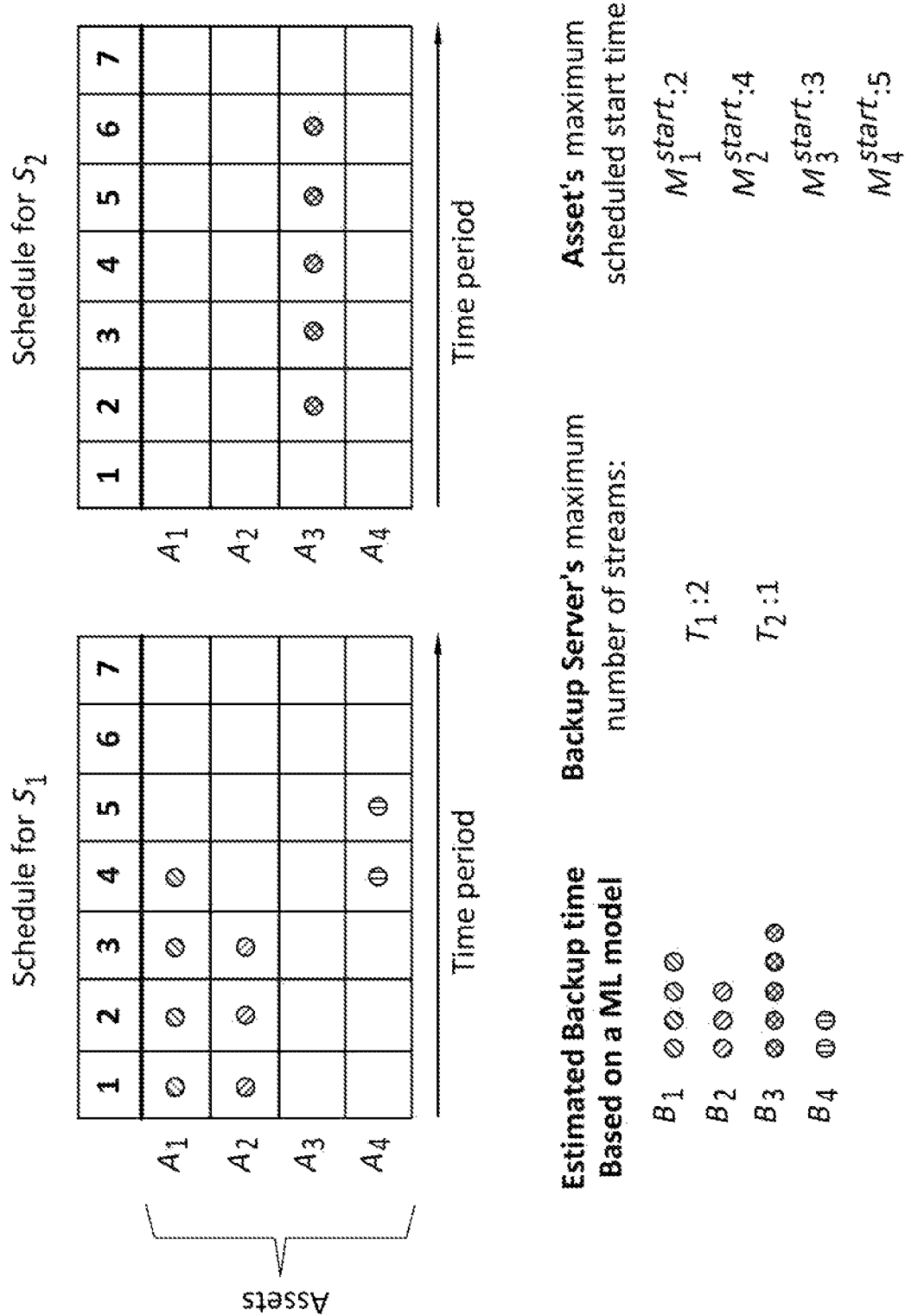
FIG. 5 discloses an example backup schedule for the solution space of FIG. 4.

Turning next to FIG. 5, and with continued reference to FIG. 4, a possible solution to the problem depicted in FIG. 4 is disclosed. Particular, FIG. 5 discloses possible output, in the form of a full-fledged backup schedule, that may be generated by methods such as those disclosed herein. It is noted that any particular backup problem may have more than one viable solution. For example, and with reference to the backup server $S_1$, the backup of asset $A_4$ could alternatively begin at time period 5 and finish in time period 6 without going outside the specified window W or violating the stream count maximum for that server $S_1$. As a further example, the backup of asset $A_3$ on backup server $S_2$ could meet the applicable window W and stream constraints if that backup began at either of time period 1 or time period 3.

With the background of FIGS. 4 and 5 in view, attention is directed now to a decomposition of the Multiple Servers Backup Plan Problem into two simpler problems, briefly addressed earlier. The first such problem may be referred to herein as the Assignment Problem, since it is concerned with determining an assignment of asset backups to particular backup servers. The Assignment Problem may be mathematically formulated given a set of constraints required by the data protection application and the objective function of the application. To illustrate, a data protection application may consider one or more of the following objectives: (i) a backup server loading balance weighted by its maximum number of allowed streams; (ii) connection latency between the backup server and the asset; and, (iii) deduplication ratio of each asset for each server.

The data protection application may also consider the following constraint, namely, that there may be a maximum number of assets that can be assigned to a given backup server, given each asset RPO, backup duration, and backup server maximum supportable stream count. Given that, in a data protection environment, one can propose a mathematical formulation to decide where to run each asset backup based upon a traditional Assignment Problem formulation. See, e.g., S. Martello and P. Toth, "*Linear Assignment Problems*," pp. 259-282, 1987.

After the Assignment Problem has been solved, the next problem to be addressed is determining when to run each backup for every server. Thus, with the decomposition proposed in this section, after solving the Assignment Problem, the Single Server Backup Scheduling problem for each server may be addressed.

Figure 6:
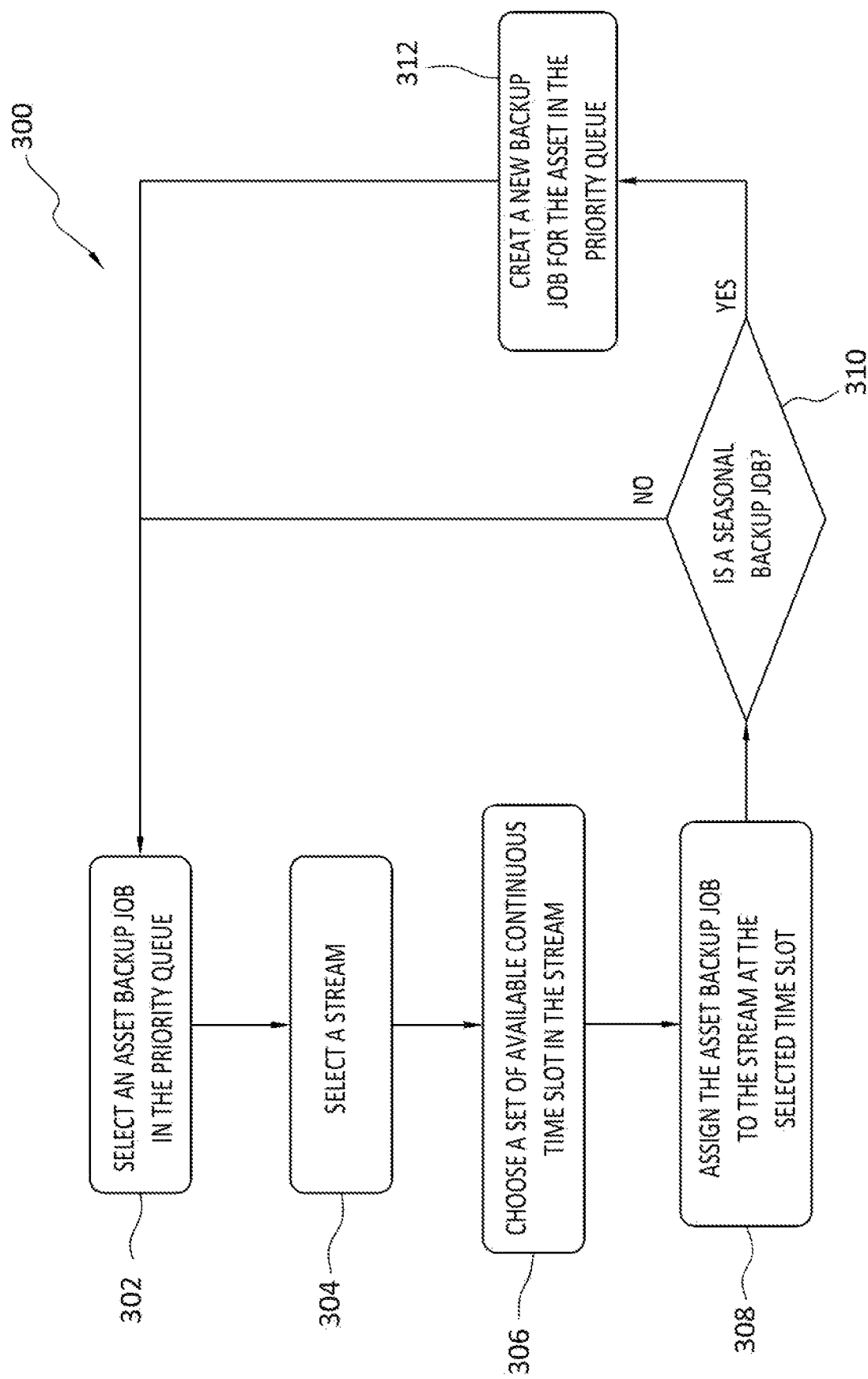
FIG. 6 discloses an example framework for determining a start time and stream for a backup job.

With reference next to FIG. 6, an example method 300 is disclosed for determining when to run each assets backup assigned to a server. In some embodiments, this method may be a generalization of the Early Deadline First (EDF) scheduling policy to address multiple streams. See, e.g., C. L. Liu and J. W. Layland, "*Scheduling Algorithms for Multiprogramming in a Hard-Real-Time Environment.,*" *J. ACM* 20, pp. 46-61, January 1973. In contrast with some scheduling approaches, at least some example embodiments of the invention do not run in an online application.

As shown in FIG. 6, the method 300 may begin when a backup job for an asset is selected from a priority queue 302. Next, a stream is selected 304 that will be responsible to execute the selected backup job. A set of available continuous, or consecutive, time slots in that stream is selected 306. The selection of consecutive time slots 306 may help to ensure that once the selected backup job has begun, that backup job may continue uninterrupted until completion. At this point in the method 300, that is after time slot selection 306, there may be enough information to schedule the selected backup job. Accordingly, the method 300 may proceed to 308 where the asset backup job is assigned to the selected stream at the selected time slot. A check may be performed to determine 310 if the backup job is a seasonal backup job or not. If not, the method 300 may return to 302. If the backup job is determined 310 to be a seasonal backup job, the method may advance to 312 where a new instance of the backup job is added to the queue. Note that a seasonal backup job may refer to a regular backup job, such a backup job that is performed on a daily or monthly basis for example.

Figure 7:
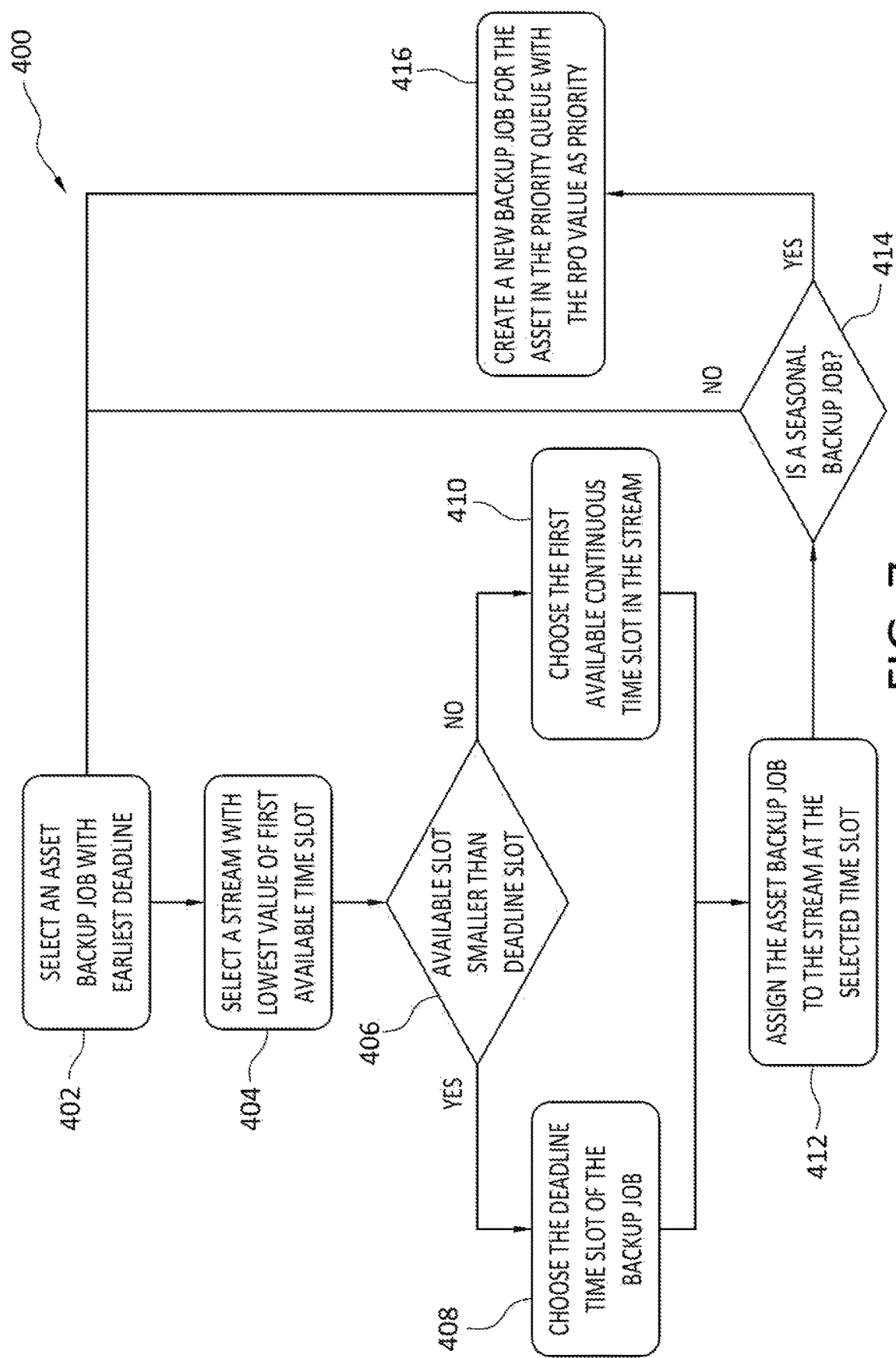
FIG. 7 discloses an example method for determining a start time and stream for a backup job.
Figure 8:
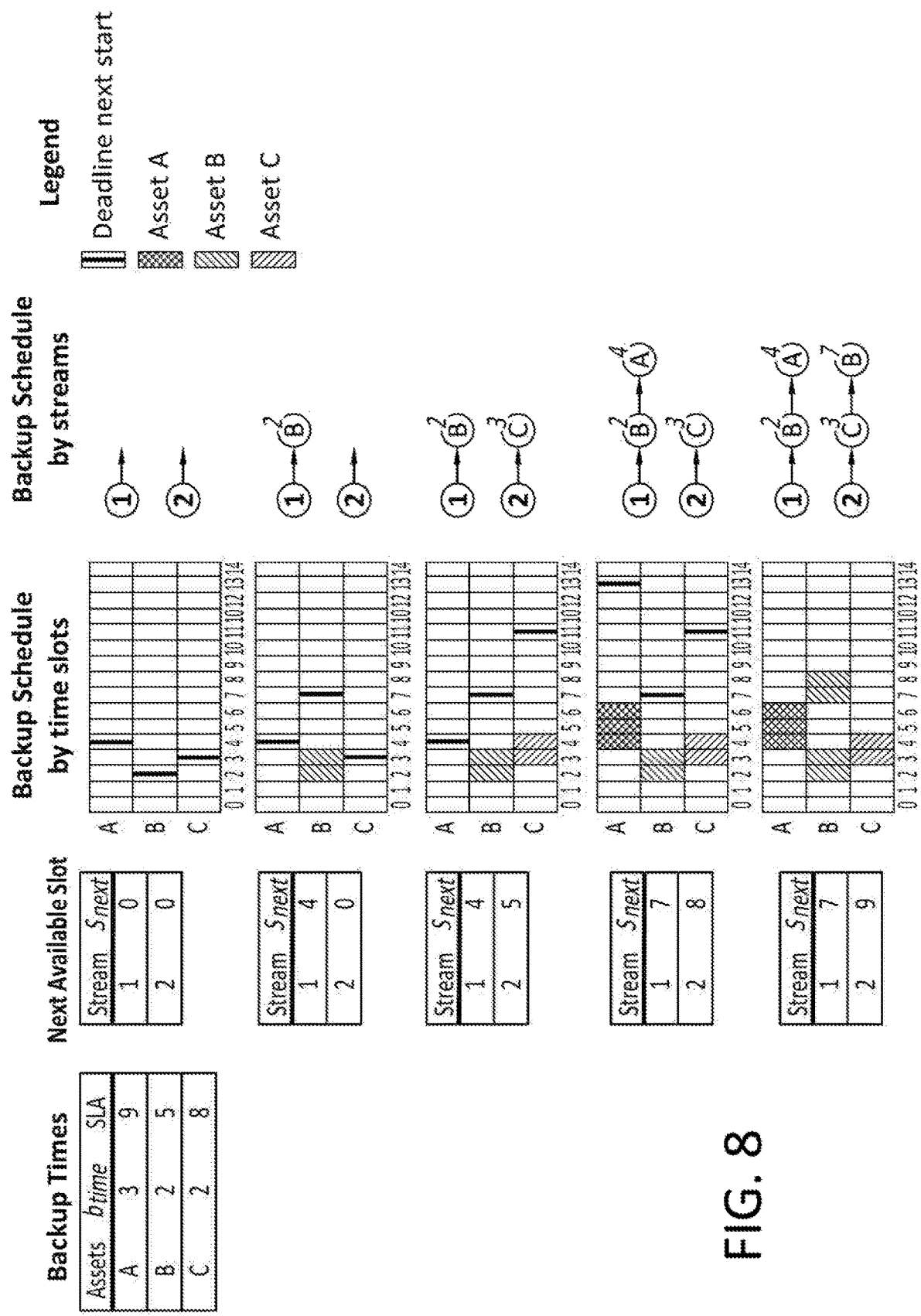
FIG. 8 discloses an example execution of the method disclosed in FIG. 7.

With the discussion of FIG. 6 in view, attention is directed now to FIGS. 7 and 8 as well, where various methods for generating backup schedules are disclosed. It is noted with respect to those methods, as well as to any of the other disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Turning now to FIG. 7 in particular, a method 400 is disclosed that provides further details concerning each general step decision of the method 300, namely, a Multi Streams Early Deadline First (MSEDF). Initially, the method 400 may begin with selection 402 of an asset backup job with the earliest start deadline. That is, the deadline is computed in terms of the next time slot that would violate RPO. Thus, as among a group of backup jobs, whichever backup job of the group must start earliest, whether due to RPO or other constraints, is considered to have the earliest start deadline.

After selection 402 of the asset backup job with the earliest deadline, the stream is selected 404 that has the lowest value of the first available time slot, that is, the stream that has been free for the longest period. With the backup job deadline information and the stream next available time slot, a decision 406 may then be made with respect to the time period in which the backup job will start, namely, the start time for the backup job. That is, if it is determined 406 that the available time slot of the stream is smaller, that is, earlier, than the deadline, the start time for the backup job is set to be the deadline 408. On the other hand, if it is determined 406 that the available time slot is not smaller than the deadline, that is, the available time slot begins after the time that the backup job must begin, then the backup job may be scheduled 410 to the next available time slot of the stream. Note that in this latter case, since the available time slot begins subsequent to, that is, later than the deadline for the backup start time, it may be possible that the backup will not complete in time, in which case an RPO violation may occur.

In either case, that is, after 408 or 410, the asset backup job may then be assigned 412 to the stream at the selected time slot. Next, if it is determined 414 that the asset backup job is not seasonal, the method may return to 402. On the other hand, if it is determined 414 that the asset backup job is seasonal, then a new backup job may be created 416. Particularly, a new backup job may be created 416 for the asset in the priority queue with the RPO value defined as the priority. That is, the priority for the new backup job in the priority queue for the selected asset may be defined as 'start time+RPO.'

With reference next to FIG. 8, an execution of the method Multi Streams Early Deadline First discussed in connection with FIG. 7, is disclosed using an illustrative example with three assets and two backup streams. Initially, it is noted that in FIG. 8, the backup scheduling is represented from two different perspectives, one by time slot and another by stream. The backup schedule, when considered from the first perspective, indicates to each asset when to run its backup jobs, while the backup schedule, when considered from the second perspective, indicates, for each stream, the execution order of the backup and its start time. Thus, example backup schedules may be configured to provide the necessary information for backup execution to both the asset that will be backed up and the target where the backup of the asset will take place.

With reference now to the particular example of FIG. 8, as well as processes 402 and 404 of FIG. 7, the first backup to run may be the backup associated with the asset B, since the deadline for starting that backup is the earliest, falling in time slot 2. This may be expressed as deadline$_B$=2. Subsequently, the stream that will be used for the backup of asset B may chosen by tiebreak to execute the backup job, since both stream 1 and stream 2 have the same value for their respective next available slot $S_{next}$, that is, "0."

With reference to processes 406 and 408 of FIG. 7, and continued reference to FIG. 8, the backup of asset B to the stream 1 may be scheduled with a with start time=2, since deadlines (time slot 2)>$S_{next}$ (time slot 0). As shown in the second chart from the top in FIG. 8, the backup of asset B is scheduled to begin in time slot 2 and complete in time slot 3. The stream schedule in FIG. 8, and with reference also to 412 of FIG. 7, indicates that the backup of asset B has been assigned to stream 1, and stream 1 will backup asset B beginning in time slot 2, while stream 2 is unused at this juncture. Note that the next backup of asset B may be determined as start time ($B_{start}$)+RPO, or 2+5=7 (updated deadline). Put another way, this means that the next backup of asset B, that is, the backup that is performed after the backup scheduled to begin in time slot 2, must begin in time slot 7, as shown in FIG. 8, in order to meet the SLA, particularly, the RPO.

In the next iteration, such as of the method 400 in FIG. 7 for example, asset C is selected for backup since it now has the earliest deadline, falling in time slot 3, namely deadline$_C$=3. As well, stream 2 is selected to handle the backup of asset C since stream 2 has the earliest $S_{next}$ as between stream 1 and stream 2. Particularly, stream 2 has an $S_{next}$ of 0, while stream 1 has an $S_{next}$ of 4 due to the previous scheduling of the backup of asset B which runs from time slot 2 through time slot 3, as discussed earlier. The backup of asset C may be scheduled to start at time slot 3, since deadline$_C$ (time slot 3)>$S_{next}$ (time slot 4). Similar to the case of the backup of asset B, the next deadline for the backup of asset C may be updated to start time ($C_{start}$) RPO, or 3+8=11 (updated deadline).

In the third, and final in this example, iteration, and with continuing reference to the method 400 of FIG. 7, as well as to FIG. 8, asset A is now the asset with the earliest deadline, in time slot 4, the deadlines for assets B and C having been previously updated as described above. That is, deadline$_A$=4. As well, stream 1 is selected for asset A since stream 1 has the earliest $S_{next}$, that is, the $S_{next}$ of stream 1 is 4, while the $S_{next}$ of stream 2 is 5. Thus, the backup job for asset A is scheduled to start in time slot 4 since deadline$_A$ is 4 which $S_{next}$ of stream 1, which is also 4. The updated deadline for asset A to be backed up is start time ($A_{start}$) RPO, or 4+9 =13 (updated deadline). After the first 3 iterations, and as shown in FIG. 8, asset B again has the earliest start time, in time slot 7.

Thus, the methods of FIGS. 7 and 8 provide a backup schedule by time slot that may be used by the assets and/or by an asset manager to initiate backups, as well as a backup schedule by streams that may be used by the backup servers and/or a backup server manager to manage backup streams. It is noted that in some embodiments, it may not be necessary to specify the stream to which a particular backup job will run. In such embodiments, at least, it may be enough to ensure simply that the backup system will not be overloaded, since overloading the system may cause errors, such as job time out, or excessive backup times as shown in FIG. 2 for example.

The example methods of FIGS. 7 and 8 may be stopped according to various criteria. For example, a backup scheduling method may be stopped after all assets have been scheduled for backup at least once. As another example, a backup scheduling method may be stopped when a given time slot has been reached. The example of FIG. 9 discloses backup scheduling for assets A, B, and C, generated using the Multi Stream Early Deadline First method discussed in connection with FIGS. 7 and 8, and extended out to the designated time slot 33, at which point the method is stopped.

Figure 9:
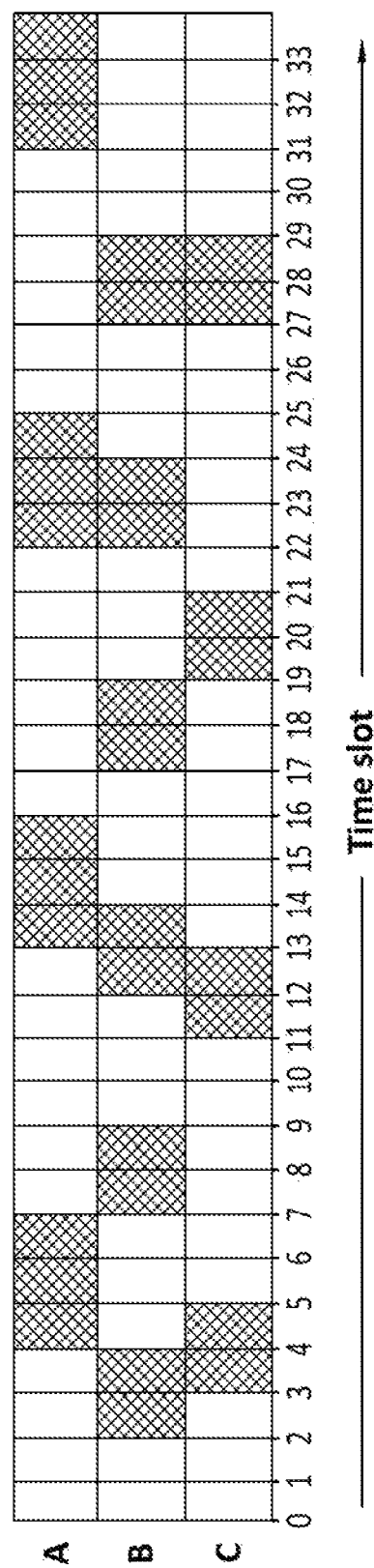
FIG. 9 discloses an extended execution of the method of FIG. 8.

As will be apparent from this disclosure, including the discussion of FIGS. 7-9, some example embodiments of the invention may approach the problem of generating a backup schedule for a multi-asset and multi-server configuration as comprising, or consisting of, two subproblems. That is, generation of the backup schedule may involve a decomposition of the global schedule backup problem into two subproblems. The first problem may concern assignment of particular assets to particular backup servers, that is, determining where to run the backup of each asset. In addressing and resolving this problem, consideration may be given to server characteristics, such as loading percentage for example, and/or to asset-server relationships, such as deduplication ratio for example, as metrics upon which to base assignment decisions. The second problem is to determine when to run the backup for each given asset, once the assets have been assigned to respective backup servers. Thus, and as illustrated in the example of FIGS. 7-9, it may be possible to leverage such decomposition of the backup scheduling problem to propose a backup schedule algorithm based upon those two decisions just noted.

As well, embodiments of the invention may provides an efficient Multi Stream Early Deadline First (MSEDF) method for SLA-compliant scheduling backup. Particularly, example embodiments may devise a backup schedule that may be used, for example, enterprise-wide to manage and efficiently decide when to run such backups.

D. Experimental Validation

Figure 10:
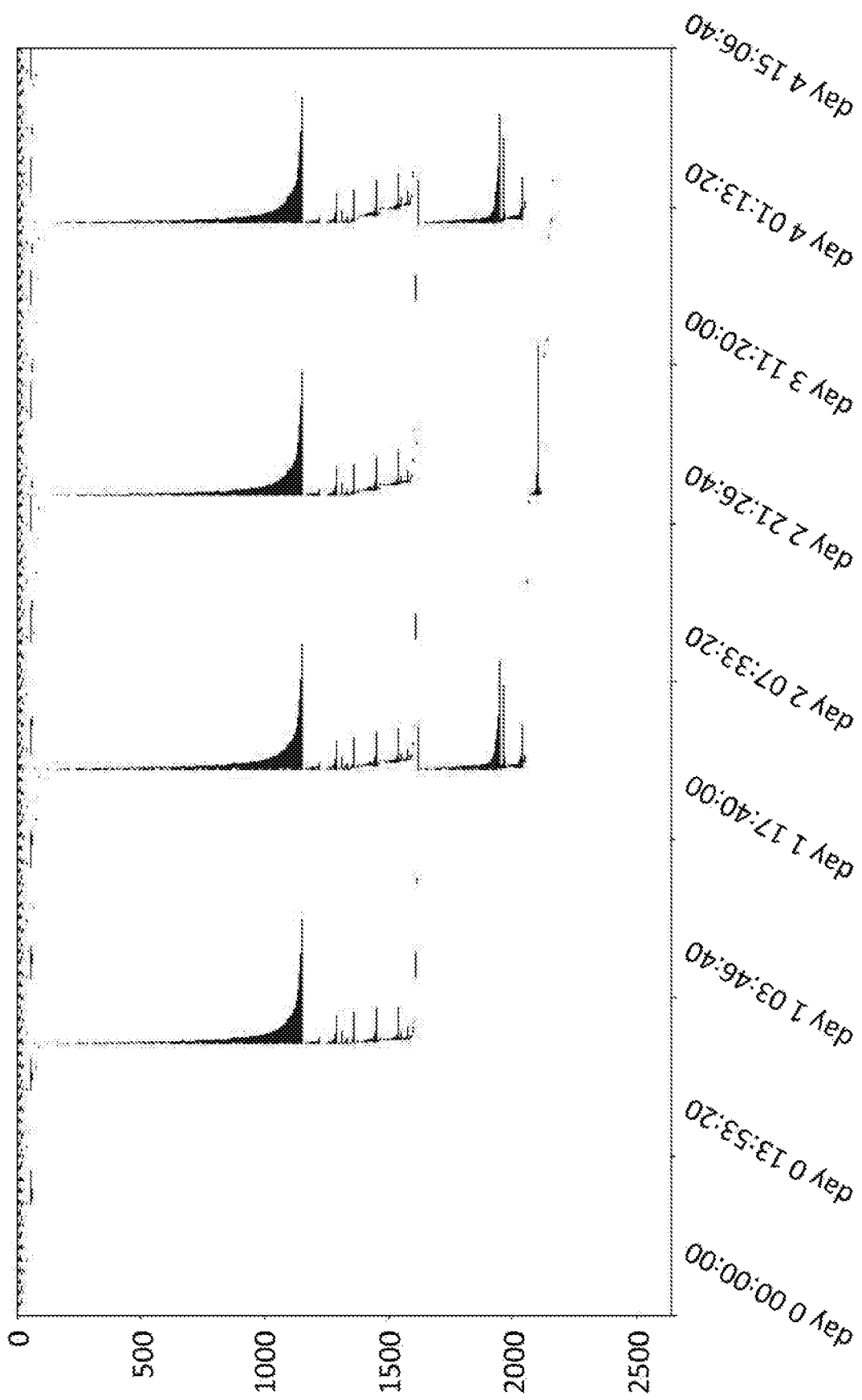
FIG. 10 discloses experimental results for one example embodiment.

In one experimental case, an embodiment was successfully employed to generate a backup plan for a server with 2645 assets, for one month, with a time granularity of one second, and a maximum total stream count of 986. Particularly, the example indicated in FIG. 10 was performed using data from a real data protection server, with time shown on the X-axis and the number of backed up assets on the Y-axis. Backed up at that server were 2645 associated assets, and the maximum number of streams supported by that server was 986. An embodiment of the invention was used to create a whole month backup schedule, considering a granularity of one second. The method was able to build generate a solution, that is, a backup schedule with the aforementioned constraints, in about 5 minutes. FIG. 10 shows a snapshot of the solution provided by one-month scheduling. Particularly, FIG. 10 discloses the first 4 days of backup scheduling snapshot after execution of the example method was commenced. It is further noted with respect to the experimental information disclosed in FIG. 10 that all the RPO constraints were met. Furthermore, FIG. 10 provides results for some assets with very low RPO, typically 1 hour, which are locate primarily near the top of the graph, and others assets with relatively RPO, typically 1 day, near the middle and lower portions of the graph.

E. Further Example Embodiments

Following are some further example embodiments of the invention. These are presented only by way of example and are not intended to limit the scope of the invention in any way.

Embodiment 1. A method, comprising: identifying a group of asset backups to be performed, where each asset backup is associated with a respective asset and has an associated backup time and RPO; selecting an asset backup to run first, wherein the asset backup that will run first is chosen based on a start deadline of that asset backup relative to respective start deadlines of one or more other asset backups, and the start deadline falls within a time slot; selecting a stream from a group of streams for the selected asset backup, wherein the selected stream is a stream with a lowest value of first available time slot; and backup up the asset at a backup server by running the asset backup selected to run first, and that backup begins at a start time that is a time when the selected stream becomes available, and the asset backup runs on the selected stream.

Embodiment 2. The method as recited in embodiment 1, wherein the operations of identifying the asset backup, selecting the asset to backup, and selecting the stream, are performed iteratively for each asset in the group.

Embodiment 3. The method as recited in embodiment 2, wherein the method stops either when: each of the assets in the group has been scheduled to be backed up at least once; or a given time slot has been reached.

Embodiment 4. The method as recited in any of embodiments 1-3, wherein a start of the time slot of the stream occurs no later than the time slot of the selected backup.

Embodiment 5. The method as recited in any of embodiments 1-4, further comprising generating an updated start deadline for the selected asset backup after the selected asset backup has been scheduled.

Embodiment 6. The method as recited in embodiment 5, wherein the updated start deadline=the start time for the backup asset+the RPO for the backup asset.

Embodiment 7. The method as recited in any of embodiments 1-6, further comprising: providing a first backup schedule to the asset, wherein the first backup schedule includes the time slot for performance of the asset backup and the start time of the asset backup; and providing a second backup schedule to the backup server, wherein the second backup schedule includes the selected stream and the asset backup scheduled to be performed on the selected stream.

Embodiment 8. The method as recited in any of embodiments 1-7, wherein multiple assets are backed up to the backup server.

Embodiment 9. The method as recited in any of embodiments 1-8, wherein a number of backup servers used for asset backups is smaller than a number of assets to be backed up, and/or a number of assets is greater than a number of streams.

Embodiment 10. The method as recited in any of embodiments 1-9, further comprising using a machine learning process to estimate, for each asset, an amount of time needed to back up that asset.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
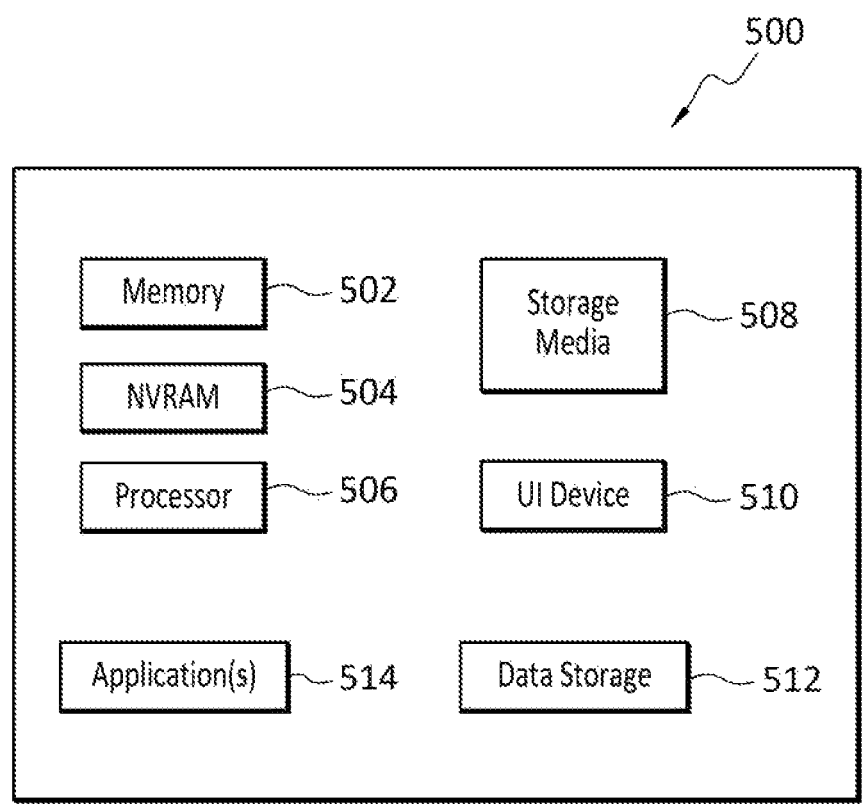
FIG. 11 discloses an example computing entity.

With reference briefly now to FIG. 11, any one or more of the entities disclosed, or implied, by FIGS. 1-10 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 11.

In the example of FIG. 11, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying a group of asset backups to be performed, where each asset backup is associated with a respective asset and has an associated backup time and RPO;
   selecting an asset backup to run first, wherein the asset backup that will run first is chosen based on a start deadline of that asset backup relative to respective start deadlines of one or more other asset backups, and the start deadline falls within a time slot;
   selecting a stream from a group of streams for the selected asset backup, wherein the selected stream is a stream with a lowest value of first available time slot; and
   backing up the asset at a backup server by running the asset backup selected to run first, and that backup begins at a start time that is a time when the selected stream becomes available, and the asset backup runs on the selected stream.

2. The method as recited in claim 1, wherein a start of the time slot of the stream occurs no later than the time slot of the selected backup.

3. The method as recited in claim 1, further comprising:
providing a first backup schedule to the asset, wherein the first backup schedule includes the time slot for performance of the asset backup and the start time of the asset backup; and
providing a second backup schedule to the backup server, wherein the second backup schedule includes the selected stream and the asset backup scheduled to be performed on the selected stream.

4. The method as recited in claim 1, wherein multiple assets are backed up to the backup server.

5. The method as recited in claim 1, wherein a number of backup servers used for asset backups is smaller than a number of assets to be backed up, and/or a number of assets is greater than a number of streams.

6. The method as recited in claim 1, further comprising using a machine learning process to estimate, for each asset, an amount of time needed to back up that asset.

7. The method as recited in claim 1, wherein the operations of identifying the asset backup, selecting the asset to backup, and selecting the stream, are performed iteratively for each asset in the group.

8. The method as recited in claim 7, wherein the method stops either when:
each of the assets in the group has been scheduled to be backed up at least once; or a given time slot has been reached.

9. The method as recited in claim 1, further comprising generating an updated start deadline for the selected asset backup after the selected asset backup has been scheduled.

10. The method as recited in claim 9, wherein the updated start deadline=the start time for the backup asset+the RPO for the backup asset.

11. A non-transitory storage medium having stored therein instructions that are executable by one or more hardware processors to perform operations comprising:
identifying a group of asset backups to be performed, where each asset backup is associated with a respective asset and has an associated backup time and RPO;
selecting an asset backup to run first, wherein the asset backup that will run first is chosen based on a start deadline of that asset backup relative to respective start deadlines of one or more other asset backups, and the start deadline falls within a time slot;
selecting a stream from a group of streams for the selected asset backup, wherein the selected stream is a stream with a lowest value of first available time slot; and
backing up the asset at a backup server by running the asset backup selected to run first, and that backup begins at a start time that is a time when the selected stream becomes available, and the asset backup runs on the selected stream.

12. The non-transitory storage medium as recited in claim 11, wherein a start of the time slot of the stream occurs no later than the time slot of the selected backup.

13. The non-transitory storage medium as recited in claim 11, wherein the operations further comprise:
providing a first backup schedule to the asset, wherein the first backup schedule includes the time slot for performance of the asset backup and the start time of the asset backup; and
providing a second backup schedule to the backup server, wherein the second backup schedule includes the selected stream and the asset backup scheduled to be performed on the selected stream.

14. The non-transitory storage medium as recited in claim 11, wherein multiple assets are backed up to the backup server.

15. The non-transitory storage medium as recited in claim 11, wherein a number of backup servers used for asset backups is smaller than a number of assets to be backed up, and/or a number of assets is greater than a number of streams.

16. The non-transitory storage medium as recited in claim 11, wherein the operations further comprise using a machine learning process to estimate, for each asset, an amount of time needed to back up that asset.

17. The non-transitory storage medium as recited in claim 11, wherein the operations of identifying the asset backup, selecting the asset to backup, and selecting the stream, are performed iteratively for each asset in the group.

18. The non-transitory storage medium as recited in claim 17, wherein the operations stop either when: each of the assets in the group has been scheduled to be backed up at least once; or a given time slot has been reached.

19. The non-transitory storage medium as recited in claim 11, wherein the operations further comprise generating an updated start deadline for the selected asset backup after the selected asset backup has been scheduled.

20. The non-transitory storage medium as recited in claim 19, wherein the updated start deadline=the start time for the backup asset+the RPO for the backup asset.

\* \* \* \* \*